United States Patent
Werner et al.

(10) Patent No.: US 10,519,792 B2
(45) Date of Patent: Dec. 31, 2019

(54) RUN-IN COATING BASED ON METAL FIBERS

(71) Applicant: MTU Aero Engines AG, Munich (DE)

(72) Inventors: André Werner, Munich (DE); Olaf Andersen, Dresden (DE); Ralf Hauser, Dresden (DE); Cris Kostmann, Pirna (DE)

(73) Assignee: MTU AERO ENGINES AG, Munich (DE)

( * ) Notice: Subject to any disclaimer, the term of this patent is extended or adjusted under 35 U.S.C. 154(b) by 960 days.

(21) Appl. No.: 14/543,384

(22) Filed: Nov. 17, 2014

(65) Prior Publication Data
US 2015/0139786 A1     May 21, 2015

(30) Foreign Application Priority Data

Nov. 19, 2013   (DE) ................ 10 2013 223 585

(51) Int. Cl.
*F01D 11/00*   (2006.01)
*F01D 9/02*    (2006.01)
(Continued)

(52) U.S. Cl.
CPC ............ *F01D 11/001* (2013.01); *F01D 5/02* (2013.01); *F01D 9/02* (2013.01); *F01D 11/02* (2013.01);
(Continued)

(58) Field of Classification Search
CPC .... B32B 3/00; B32B 3/10; B32B 3/18; B32B 3/26; B32B 5/02; B32B 5/022; B32B 5/024; B32B 5/026; B32B 5/028; B32B 5/08; B32B 5/18; B32B 5/24; B32B 5/245; B32B 5/26; B32B 15/04; B32B 15/046; B32B 15/14; B32B 15/15; B32B 15/18; B32B 9/005; B32B 13/02; B32B 27/04; B32B 2260/021; B32B 2260/04; B32B 2260/044; B32B 2262/103; B32B 2603/00; B32B 2266/04; B32B 2266/06; F01D 9/02; F01D 5/28; F01D 5/02; F01D 11/001; F01D 11/02; F01D 11/12; F01D 11/08; F01D 11/122; F01D 11/125; F05D 2240/55;
(Continued)

(56) References Cited

U.S. PATENT DOCUMENTS 3,310,387 A   3/1967   Sump et al.
4,075,364 A   2/1978   Panzera
(Continued)

FOREIGN PATENT DOCUMENTS

DE   2937463 A1   4/1980
DE   3015867 A1   4/1980
(Continued)

*Primary Examiner* — Jason D Shanske
*Assistant Examiner* — Eric J Zamora Alvarez
(74) *Attorney, Agent, or Firm* — Abel Schillinger, LLP

(57) ABSTRACT

The present invention relates to a run-in coating for a turbomachine, in particular for an aero engine, to be attached to a seal between a rotor and a stator, wherein the run-in coating comprises a metallic scaffold having interstices which are filled with an inorganic-nonmetallic filler material, and wherein the metallic scaffold is formed from an arrangement of metal fibers (9). The invention also relates to a corresponding turbomachine.

3 Claims, 1 Drawing Sheet

(51) Int. Cl.
*F01D 5/02* (2006.01)
*F01D 11/12* (2006.01)
*F01D 11/02* (2006.01)

(52) U.S. Cl.
CPC ........ *F01D 11/125* (2013.01); *F05D 2240/55* (2013.01); *F05D 2300/614* (2013.01); *Y02T 50/672* (2013.01); *Y10T 442/2926* (2015.04)

(58) Field of Classification Search
CPC ............. F05D 2240/56; F05D 2240/57; F05D 2240/58; F05D 2240/581; F05D 2240/59; F05D 2300/614; Y10T 428/12444; Y10T 428/12486; Y10T 428/12931; Y10T 442/2926; Y02T 50/672
USPC .......... 416/241 B, 241 R; 428/608, 614, 678
See application file for complete search history.

(56) References Cited

U.S. PATENT DOCUMENTS

| | | | |
|---|---|---|---|
| 4,209,334 A | 6/1980 | Katayama et al. | |
| 4,247,249 A | 1/1981 | Siemers | |
| 4,257,735 A | 3/1981 | Bradley et al. | |
| 4,273,824 A | 6/1981 | McComas et al. | |
| 4,629,397 A | 12/1986 | Schweitzer | |
| 4,639,388 A * | 1/1987 | Ainsworth | B32B 15/04 228/120 |
| 4,960,817 A * | 10/1990 | Spadafora | C09D 183/04 524/440 |
| 5,162,480 A * | 11/1992 | Schilling, Jr. | C08G 77/08 528/23 |
| 5,326,647 A | 7/1994 | Merz et al. | |
| 5,459,114 A * | 10/1995 | Kaya | C04B 35/589 106/287.11 |
| 6,544,351 B2 * | 4/2003 | Wang | C09D 7/1216 148/22 |
| 6,547,522 B2 * | 4/2003 | Turnquist | F01D 11/122 415/173.3 |
| 7,479,328 B2 | 1/2009 | Roth-Fagaraseanu et al. | |
| 7,666,528 B2 * | 2/2010 | Hazel | C23C 26/00 428/469 |
| 7,955,694 B2 * | 6/2011 | Hazel | B05D 7/14 416/241 R |
| 8,650,753 B2 | 2/2014 | Sellars et al. | |
| 2002/0132131 A1 * | 9/2002 | Bossmann | C23C 28/00 428/615 |
| 2002/0192074 A1 | 12/2002 | Turnquist et al. | |
| 2005/0276688 A1 | 12/2005 | Roth-Fagaraseanu et al. | |
| 2010/0143103 A1 | 6/2010 | Sellars et al. | |
| 2011/0103940 A1 * | 5/2011 | Duval | F01D 5/284 415/173.4 |
| 2011/0127728 A1 | 6/2011 | Haubold et al. | |
| 2012/0027572 A1 | 2/2012 | Denece et al. | |
| 2014/0227088 A1 | 8/2014 | Beaujard et al. | |

FOREIGN PATENT DOCUMENTS

| | | |
|---|---|---|
| DE | 2950150 A1 | 6/1980 |
| DE | 4130946 C1 | 9/1992 |
| DE | 10334698 A1 | 2/2005 |
| EP | 0192162 | 8/1986 |
| EP | 1013890 A2 | 6/2000 |
| EP | 1270876 A2 | 1/2003 |
| EP | 2196632 A2 | 6/2010 |
| EP | 2327879 A2 | 6/2011 |
| GB | 2049484 | 12/1980 |
| GB | 2108534 A | 5/1983 |
| GB | 2496887 A | 5/2013 |
| WO | 2010103213 A1 | 9/2010 |
| WO | 2013034837 A1 | 3/2013 |

* cited by examiner

RUN-IN COATING BASED ON METAL FIBERS

CROSS-REFERENCE TO RELATED APPLICATIONS

The present application claims priority under 35 U.S.C. § 119 of German Patent Application No. 102013223585.2, filed Nov. 19, 2013, the entire disclosure of which is expressly incorporated by reference herein.

BACKGROUND OF THE INVENTION

1. Field of the Invention

The present invention relates to a run-in coating for a turbomachine, in particular an aero engine, to be attached to a seal between a rotor and a stator, wherein the run-in coating comprises a metallic scaffold having interstices which are filled with an inorganic-nonmetallic filler material.

2. Discussion of Background Information

In turbomachines, such as static gas turbines or aero engines, a rotor in the form of a rotating shaft having a multiplicity of rotor blades rotates with respect to a stator which is formed by the surrounding casing and guide vanes arranged thereon. In order to achieve a high degree of efficiency, all the working gas flowing through the machine should, as far as is possible, flow along the provided flow path between the guide vanes and the rotor blades. Accordingly, it should be avoided that working gas can flow between the free ends of the guide vanes and/or rotor blades and those machine parts which lie opposite and move relative thereto. It is accordingly known to provide seals between the respective components, specifically in the form of what is termed the outer air seal or the inner air seal, such that, under all operating conditions, as far as is possible, no flow losses of working gas occur in the region of the free ends of guide vanes and rotor blades. To that end, in the prior art, claddings and/or what are termed sealing fins are provided together with run-in coatings into which the claddings and/or sealing fins can cut, such that the flow losses are kept as low as possible also in the case of changes in the interstices between the free ends of the guide vanes and rotor blades with respect to the opposing machine components during various operating conditions.

For the wear coatings and/or run-in coatings, it is possible to use metal foams as described in EP 1013890 B1, the entire disclosure of which is incorporated by reference herein.

Furthermore, composite materials are known for corresponding seals, in which a metal matrix is combined for example with boron nitride as wear protection particle, as described in EP 2327879 A2 and EP 2196632 A2, for example, the entire disclosures of which are incorporated by reference herein.

However, such materials and, respectively, seals or run-in coatings are in part expensive and difficult to produce, and also the property profile, with respect to a sealing structure with sufficient strength but at the same time as little resistance as possible with respect to a rubbing seal partner, should be fulfilled in a balanced manner. For that reason, there is further a need for improved run-in coatings for use in turbomachines such as static gas turbines and aero engines.

It is therefore advantageous to provide a run-in coating for turbomachines, in particular aero engines, which has a balanced property profile with respect to sealing, strength and frictional resistance with respect to a seal partner, and which is also to be as simple as possible to produce.

SUMMARY OF THE INVENTION

The present invention provides a run-in coating and a turbomachine as set forth in the claims. Advantageous configurations form the subject matter of the dependent claims.

The invention proposes, for a run-in coating, instead of the metal scaffold made of a metal foam as known in the prior art, to provide a metal scaffold which is not formed from a foam but from metal fibers. It is thus possible both to simplify production and to improve the structural strength of the run-in coating.

The corresponding metal scaffold made of metal fibers can further have an inorganic-nonmetallic filler in order to fill the interstices between the fibers and thus ensure the sealing property of the run-in coating.

The metal fibers may be present in the form of a knit, a braid, a woven or a felt. In this context, a knit is understood as a thread system in which the metal fibers are connected to one another by forming loops, whereas a woven is understood as a crossing thread system of metal fibers crossing each other at, in particular, right angles. A metal felt is a sheet material of unordered metal fibers which are interlocked with one another. A braid is in general understood as a product of a plurality of interlaced threads, wherein the threads or fibers are present in an ordered arrangement.

The metal fibers may, in addition to the form-fitting connection in the form of a knit, a braid, a woven or a felt, also be material-bonded to one another, wherein the metal fibers may in particular be sintered to one another, such that for example in the case of a metal fiber felt the positions of the metal fibers interlocked with one another are fixed by the sintering process.

The metal fibers may be formed from various suitable metals or alloys, wherein, for applications in aero engines, in particular iron-chromium-aluminum alloys, in particular what are termed heat-conducting alloys, have proved of value. These consist of the principal constituents iron, chromium and aluminum, listed in order of decreasing content.

The fillers for filling the interstices between the metal fibers may be formed from or comprise polymer-derived ceramic foams or self-curing cements.

The polymer-derived ceramic foams are based on silicon-containing polymers, such as polysilazanes, polysiloxanes and carbosilanes, which are converted by pyrolysis to silicon carbonitrides or silicon carboxynitrides.

The self-curing cements may be formed from or comprise calcium phosphate cement, in particular magnesium-calcium-phosphate cement. In this context, self-curing is understood to mean that no additional substances for initiating the curing process need be added and also that no external stimuli such as introduction of heat or irradiation with light are required for curing.

BRIEF DESCRIPTION OF THE DRAWINGS

In the appended purely schematic drawings.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
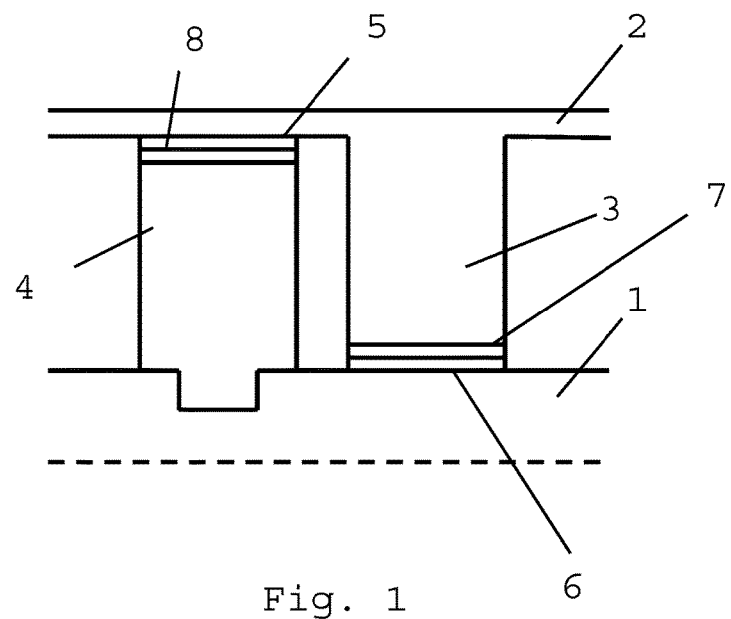
FIG. 1 shows a partial section through a turbomachine having a guide vane/rotor blade pair.

FIG. 1 shows a partial section through a turbomachine such as an aero engine, having a shaft 1 which is surrounded in annular fashion by a casing 2, wherein however FIG. 1 shows only one part above the line of symmetry or axis of rotation, which is represented by a dashed line. A multiplicity of rotor blades 4 are arranged on the shaft 1, circumferentially around the shaft 1, next to one another in a rotor blade row and in multiple rotor blade rows, wherein FIG. 1 shows only one rotor blade row with one rotor blade 4. A guide vane 3, which is attached to the casing 2, is arranged adjacent to the rotor blade 4, wherein again in each case multiple guide vanes are arranged circumferentially next to one another about the axis of rotation in multiple guide vane rows. The guide vanes 3 are connected to the casing 2 at fixed locations while the rotor blades 4 rotate with the shaft 1.

In order to avoid flow losses between the casing 2 and the tips of the rotor blades 4 on one hand and between the free ends of the guide vanes 3 and the shaft 1 on the other hand, seals are arranged in these regions, specifically on one hand what is referred to as an outer air seal in the region of the tips of the rotor blades 4 and an inner air seal in the region of the free ends of the guide vanes 3.

The seals respectively consist of seal pairs which are matched to each other, for example a tip cladding 5 at the free ends of the rotor blades 4 with what is termed a run-in coating 8 which is arranged on the casing 2 opposite the free ends of the rotor blades 4.

Since the gap between the free ends of the rotor blades 4 and the casing 2 can change depending on the operating conditions, the corresponding seal is configured such that the tip cladding 5 grinds against or cuts into the run-in coating 8 in order to ensure an optimum seal. Accordingly, what are termed sealing fins (not shown), which are in each case formed as projecting ridges and cut defined grooves into the run-in coating 8, may be provided on the tip cladding 5.

Accordingly, what is referred to as the inner air seal may also be provided with a cladding 6 having a run-in coating 7, wherein the cladding 6 and run-in coating 7 can be arranged in any manner on the rotor, i.e. the shaft 1, or on the stator, i.e. the guide vane 3. This is also the case for the outer air seal.

Figure 2:
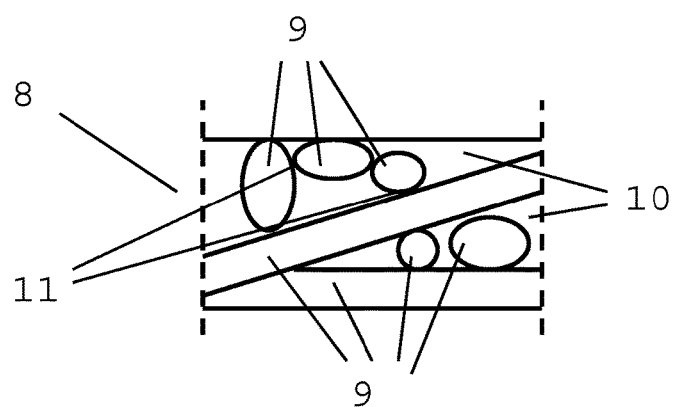
FIG. 2 shows a section through a run-in coating according to the invention.

According to the invention, the run-in coating 7, 8 is formed in the present exemplary embodiment by a sintered metal fiber felt filled with a ceramic foam, for example the product marketed as Feltmetall FM 452 by Technetics, while the ceramic foam filling the interstices 10 between the fibers 9 is formed from a pyrolyzed siloxane HTA 1500 Rapid Cure from KION. The sectional representation of FIG. 2 shows various metal fibers 9 which are material-bonded to one another at contact points 11, in that they are sintered together. In the interstices 10 between the metal fibers, and in part accordingly at the surface of the run-in coating 8, there is a ceramic foam made of silicon carbooxynitride resulting from pyrolysis of the siloxane during production. Such a run-in coating 8 has the advantage that low—or even eliminated—porosity results in low permeability, such that working gas of the turbomachine cannot pass through the run-in coating 8 and flow losses are thus avoided. Furthermore, the combination of sintered metal fiber felt and ceramic foam results in a stable and sufficiently strong run-in coating which nonetheless allows the sealing partner, for example in the form of sealing fins, to cut into it easily.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A run-in coating for a turbomachine, wherein the run-in coating is for attaching to a seal between a rotor and a stator and comprises a metallic scaffold, which scaffold is formed from an arrangement of metal fibers and comprises interstices which are filled with an inorganic-nonmetallic filler material, wherein the metal fibers are formed from an FeCrAl alloy.

2. A run-in coating for a turbomachine, wherein the run-in coating is for attaching to a seal between a rotor and a stator and comprises a metallic scaffold, which scaffold is formed from an arrangement of metal fibers which are material-bonded to one another and comprises interstices which are filled with an inorganic-nonmetallic filler material, wherein the metal fibers are formed from an FeCrAl alloy.

3. A run-in coating for a turbomachine, wherein the run-in coating is for attaching to a seal between a rotor and a stator and comprises a metallic scaffold, which scaffold is formed from an arrangement of metal fibers which are sintered to one another and comprises interstices which are filled with an inorganic-nonmetallic filler material, wherein the metal fibers are formed from an FeCrAl alloy.

* * * * *